(12) United States Patent  
Fowler

(10) Patent No.: US 8,777,254 B1
(45) Date of Patent: Jul. 15, 2014

(54) PORTABLE ELEVATED HUNTING BLIND

(76) Inventor: John D. Fowler, Granbury, TX (US)

(*) Notice: Subject to any disclaimer, the term of this patent is extended or adjusted under 35 U.S.C. 154(b) by 139 days.

(21) Appl. No.: 13/312,334

(22) Filed: Dec. 6, 2011

Related U.S. Application Data

(60) Provisional application No. 61/420,320, filed on Dec. 7, 2010.

(51) Int. Cl.
A01M 31/02 (2006.01)

(52) U.S. Cl.
CPC .................................. A01M 31/02 (2013.01)
USPC ........................................................ 280/656

(58) Field of Classification Search
CPC ...... A01M 31/02; Y10S 135/901; E06C 1/39; E06C 5/04
USPC .......... 804/656, 657; 182/63.1; 296/198, 180; 280/656, 657; 52/79.1
See application file for complete search history.

(56) References Cited

U.S. PATENT DOCUMENTS

| | | | |
|---|---|---|---|
| 3,289,787 A * | 12/1966 | McSwain ........................ 182/20 |
| 4,511,181 A * | 4/1985 | Schantz ............................ 298/5 |
| 5,862,827 A * | 1/1999 | Howze ........................ 135/88.01 |
| 6,347,684 B1 * | 2/2002 | Fath et al. ..................... 182/63.1 |
| 6,948,280 B2 | 9/2005 | Marcinkowski et al. |
| 7,104,360 B2 * | 9/2006 | Atkins ........................ 182/69.2 |
| 7,255,526 B2 * | 8/2007 | Friesenhahn et al. ......... 414/483 |
| 7,513,333 B2 * | 4/2009 | Davis ........................... 182/63.1 |
| 7,967,325 B1 * | 6/2011 | Burton et al. ................. 280/656 |
| 2003/0051942 A1 * | 3/2003 | Atkins ......................... 182/63.1 |
| 2007/0029136 A1 * | 2/2007 | Kirby .......................... 182/63.1 |
| 2009/0101438 A1 * | 4/2009 | Davis ........................... 182/141 |
| 2009/0107762 A1 * | 4/2009 | Davis .......................... 182/63.1 |

* cited by examiner

Primary Examiner — J. Allen Shriver, II
Assistant Examiner — Brian Cassidy
(74) Attorney, Agent, or Firm — Nilay J. Choksi; Ronald E. Smith; Smith & Hopen, P.A.

(57) ABSTRACT

An elevated hunting blind has a hunting blind housing with a support frame. The elevated hunting blind has a substantially upright position, such that the support frame supports the housing, and a substantially level position, such that the support frame embodies a load-bearing trailer. Wheels may be attached to the support frame, such that when the elevated hunting blind is in the level position, the wheels are in contact with the ground to support the load-bearing trailer. An elongated hinging member has a first end having a trailer tongue suitable for attachment to a tow hitch and a second end rotatably connected to the support frame, so the trailer tongue can maintain constant attachment to the tow hitch on a vehicle in both the upright position and the level position.

8 Claims, 7 Drawing Sheets

PORTABLE ELEVATED HUNTING BLIND

CROSS-REFERENCE TO RELATED APPLICATIONS

This application claims priority to U.S. Provisional Application No. 61/420,320, entitled "Transportable deer blind/cargo trailer," filed on Dec. 7, 2010, the contents of which are hereby incorporated by reference into this disclosure.

BACKGROUND OF THE INVENTION

1. Field of the Invention

This invention relates, generally, to hunting blinds. More particularly, it relates to a hunting blind that can also be engaged as a load-bearing, usable trailer for portability.

2. Description of the Prior Art

Hunting blinds and deer blinds are well-known in the art. There are a multitude of types of hunting blinds, including elevated blinds, ground blinds, trailer blinds and situational blinds, such as deer blinds and duck blinds. Each has varying degrees of usability, portability and complexity. For example, ground blinds are designed to cover hunters on the ground and in many cases can be folded up into a small pouch for portability.

However, elevated blinds inherently are not as easily portable because they require the support structure to sustain its housing up to dozens of feet in the air. Elevated blinds must also be made of a material that is sustainable in varying weather and also be comfortable for users to remain inside the housing for long periods of time.

Elevated hunting blinds that are portable are also known in the art. However, in many cases, when using a truck to transport the hunting blind, the truck bed is used for the hunting blind, thereby limiting storage space for other hunting and non-hunting materials.

Moreover, elevated hunting blinds that are portable tend to be cumbersome to erect upon reaching the desired destination point. Often, these hunting blinds require multiple people to safely erect the hunting blind to its maximum height. Those blinds that do not require multiple people to erect tend to be too small to accommodate multiple people in its elevated housing. Thus, users have less flexibility with regards to the dangers of erecting an elevated hunting blind, the ability to accommodate multiple persons, and the ability to transport other items with the elevated hunting blind.

Further, conventional portable elevated hunting blinds use hydraulics or motors, or both, to erect the blinds and collapse them for transportation. Several problems tend to arise with this aspect of these conventional blinds. Hydraulics and motors require constant maintenance and repair to prevent malfunction or deterioration. Users incur extra costs and labor in maintaining the automated hunting blinds. Additionally, hunting blinds that collapse generally provide no function other than occupying space during transportation. Thus, hunters must often choose between bringing a hunting blind and bringing other cargo, for example a 4x4 vehicle, when going on a hunting trip.

Accordingly, what is needed is a multi-functional, more portable elevated hunting blind. However, in view of the art considered as a whole at the time the present invention was made, it was not obvious to those of ordinary skill how the art could be advanced.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for an improved, more usable and more portable elevated hunting blind is now met by a new, useful and nonobvious invention.

An embodiment of the current invention includes an elevated hunting blind having a hunting blind housing disposed in overlying relation to and securely attached to a support frame, wherein the elevated hunting blind has a first position and a second position. The first position is a substantially upright position, such that the support frame is adapted to support the housing. The second position is a substantially level position, such that the support frame is adapted to embody a load-bearing trailer. This embodiment also includes wheels attached to the support frame, such that when the elevated hunting blind is in the first position, the wheels are not in contact with the ground, and when the elevated hunting blind is in the second position, the wheels are in contact with the ground to support the load-bearing trailer during transportation. This embodiment further includes an elongated hinging member with a first end and a second end. The first end has a trailer tongue suitable for attachment to a tow hitch, and the second end is rotatably connected to the support frame, so the trailer tongue can maintain constant attachment to the tow hitch on a vehicle in both the first position and the second position.

The hunting blind housing is capable of accommodating at least one person in a seated position. The hunting blind housing may also accommodate at least one person in a supine position.

The elevated hunting blind, when set in the first position, is adapted to support the hunting blind housing at a height of about twenty (20) feet.

The elevated hunting blind, when set in the second position, is secured within a truck bed of the vehicle.

A separate embodiment discloses a method of erecting and collapsing an elevated hunting blind. The steps include securing the first end of the hinging member in a substantially level position to the rear of a vehicle; deploying the elevated hunting blind at a desired destination without use of hydraulics or electricity by accelerating the vehicle in reverse until the elevated hunting blind has pivoted into a substantially upright position; and securing the elevated hunting member into the ground on which the elevated hunting blind is stationed.

The user may release the first end of the hinging member from the rear of the vehicle, so the elevated hunting blind can be a standalone structure in the substantially upright position.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Moreover, in the following detailed description, reference is made to the front, back, top or ceiling, and bottom of the elevated hunting blind. This orientation is in reference to the hunting blind positioned in a substantially upright position. Though the current invention is referred to as a hunting blind and can be used as such, other uses are contemplated as well, including, but not limited to, animal observation and photography, nature observation and photography, security tower or other uses where it is advantageous for an individual to be positioned at an elevated height.

Certain embodiments of the current invention include an elevated hunting blind that is portable and usable both as a hunting blind and as a load-bearing trailer. The housing of the hunting blind can be made of any suitable material that can properly accommodate hunters and withstand weather at a height ranging from a couple feet off the ground up to several dozen feet off the ground. The support frame underneath the housing can be made of any suitable rigid material that can withstand weather, can support the housing in an upright position with and without hunters within the capacity of the housing, and can support weight when in a level position as the trailer. The current invention also contemplates camouflage designs on the elevated hunting blind, dependent on the needs of the user. Many times hunters find it advantageous to try to blend in with the surrounding environment while hunting.

Substantially Upright Position

Figure 1:
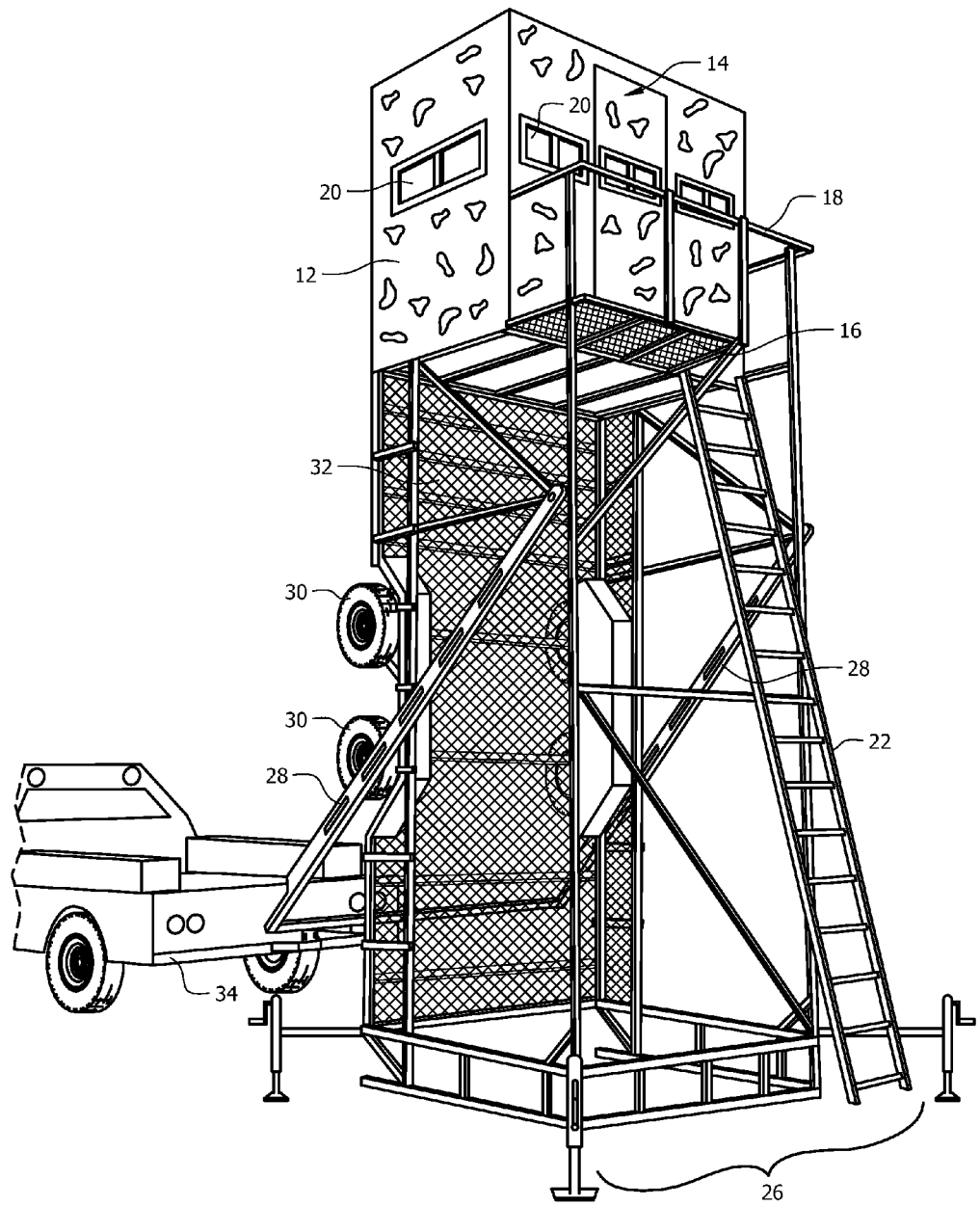
FIG. 1 is a corner perspective view of a portable elevated hunting blind in a substantially upright position.
Figure 2:
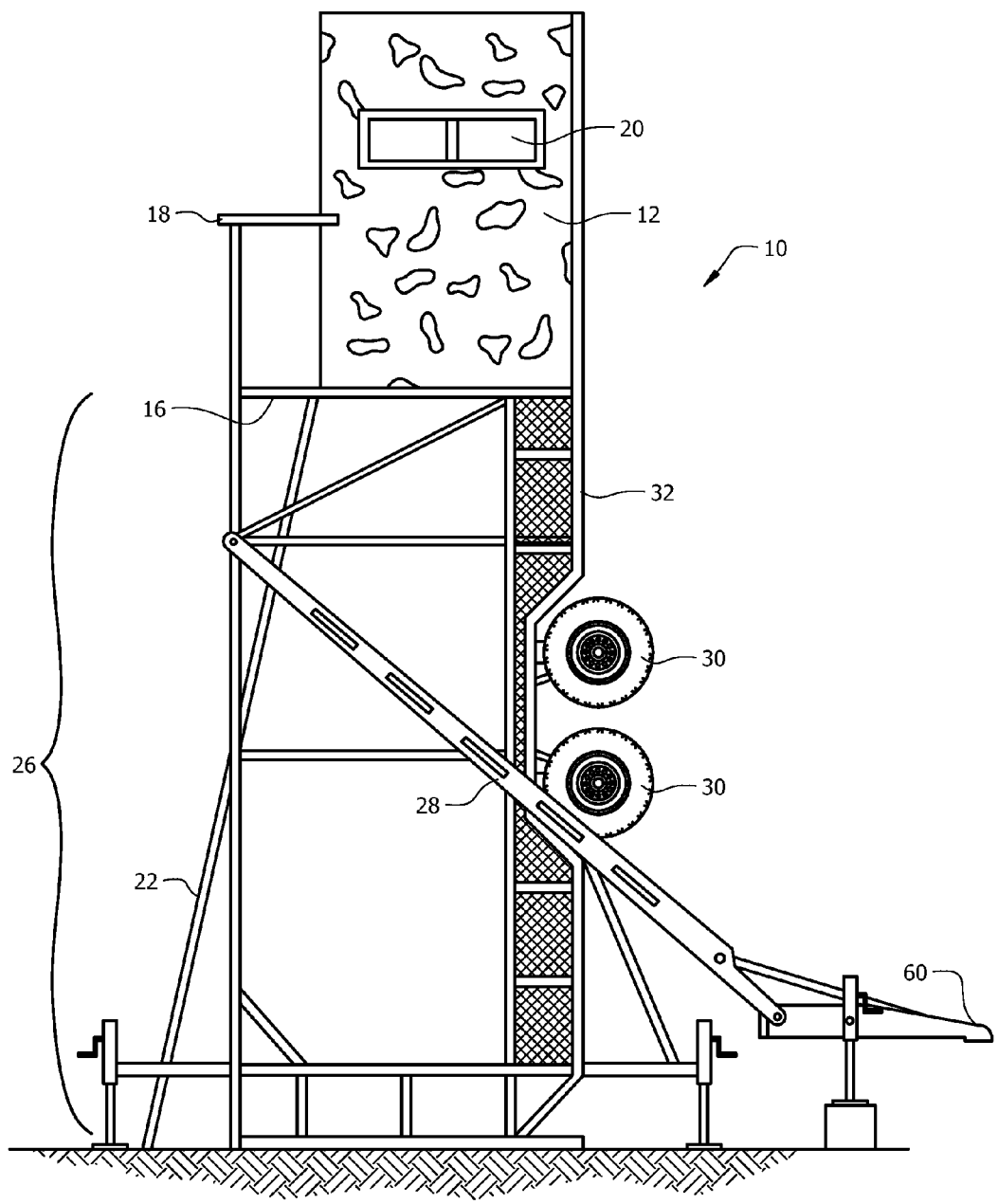
FIG. 2 is a side view of a portable elevated hunting blind in a substantially upright position.
Figure 3:
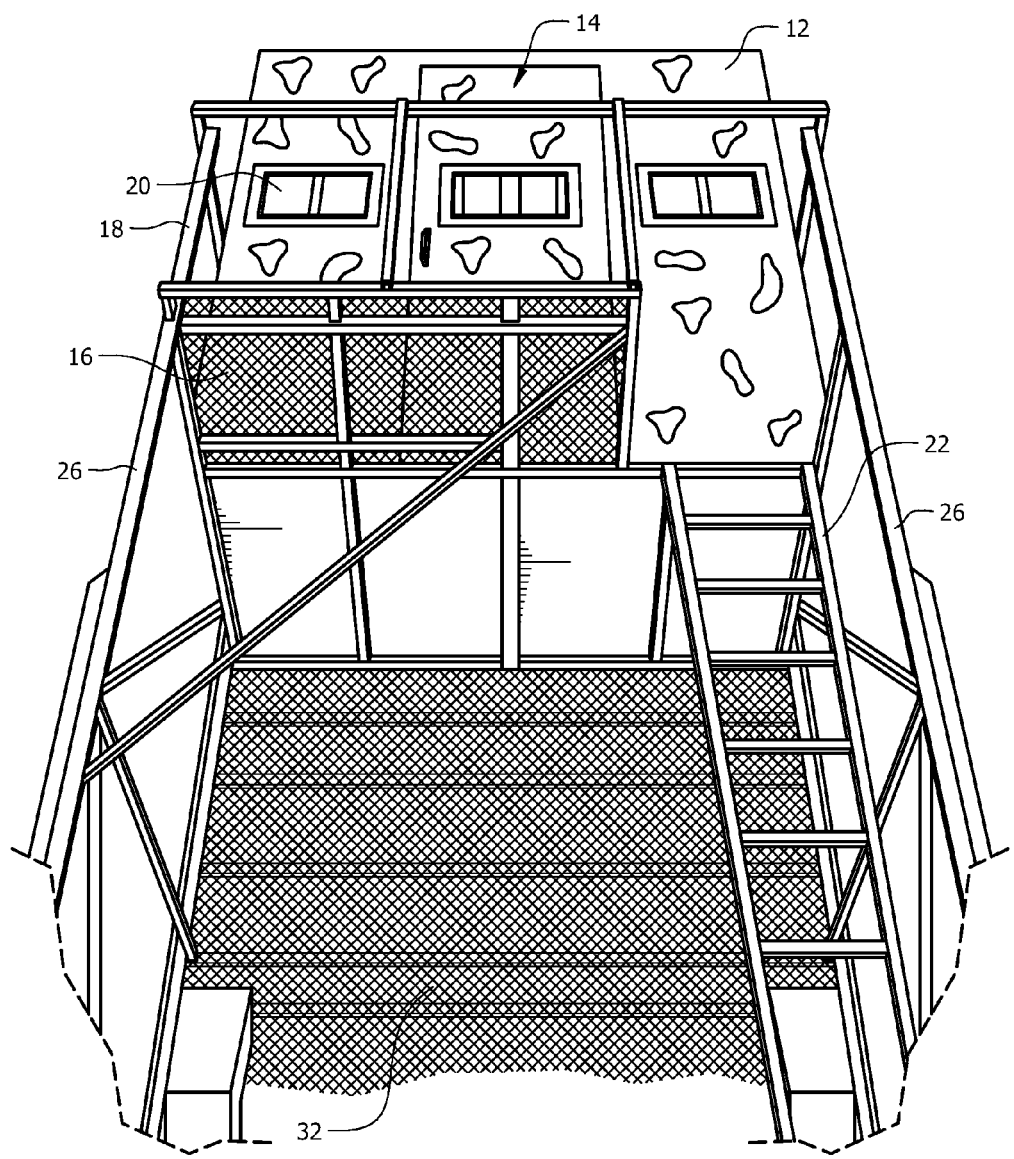
FIG. 3 is a lower perspective view of the front a housing of a portable elevated hunting blind in a substantially upright position.

As depicted in FIGS. 1-3, elevated hunting blind, denoted generally by the reference numeral 10, has a first position associated with being substantially upright. Hunting blind 10 includes housing 12 that has a general shape of a cube or rectangular prism, though other shapes are contemplated. Thus, housing 12 has a front wall, back wall, side walls, floor and ceiling. In the shape of a cube or rectangular prism, housing 12 includes door 14, as seen in FIG. 3, formed within the front wall and blending in with the front wall, enabling a user to enter and exit housing 12. Extending laterally from the floor of housing 12 away from the front wall of housing 12 is substantially horizontal walkway 16 on which a user can stand to hunt or to enter and exit housing 12 using door 14. A plurality of railings 18 may also be included for stability and safety when standing or walking on walkway 16.

Housing 12 also includes at least one aperture 20 from which the user can view the exterior or fire a weapon, or both, while inside housing 12. Hunting blind 10 also may include a ladder 22 extending from the ground to walkway 16 to enable the user to access walkway 16 and housing 12 and to provide additional support for housing 12. Other mechanisms can also be used to access walkway 16 and housing 12, including, but not limited to, foldable steps, a sliding pole and other suitable mechanisms to transport up and down hunting blind 10. All of such structures are within the scope of this invention.

Hunting blind 10 also includes a support frame 26 that supports housing 12 and is disposed in underlying relation to housing 12. Support frame 26 allows hunting blind 10 to rest stably in an upright position. Support frame 26 includes a substantially flat and rectangular base 32 extending vertically from the floor of housing 12. Substantially flat and rectangular base 32 may also have raised edges and can merge with and form the back wall of housing 12.

Figure 7:
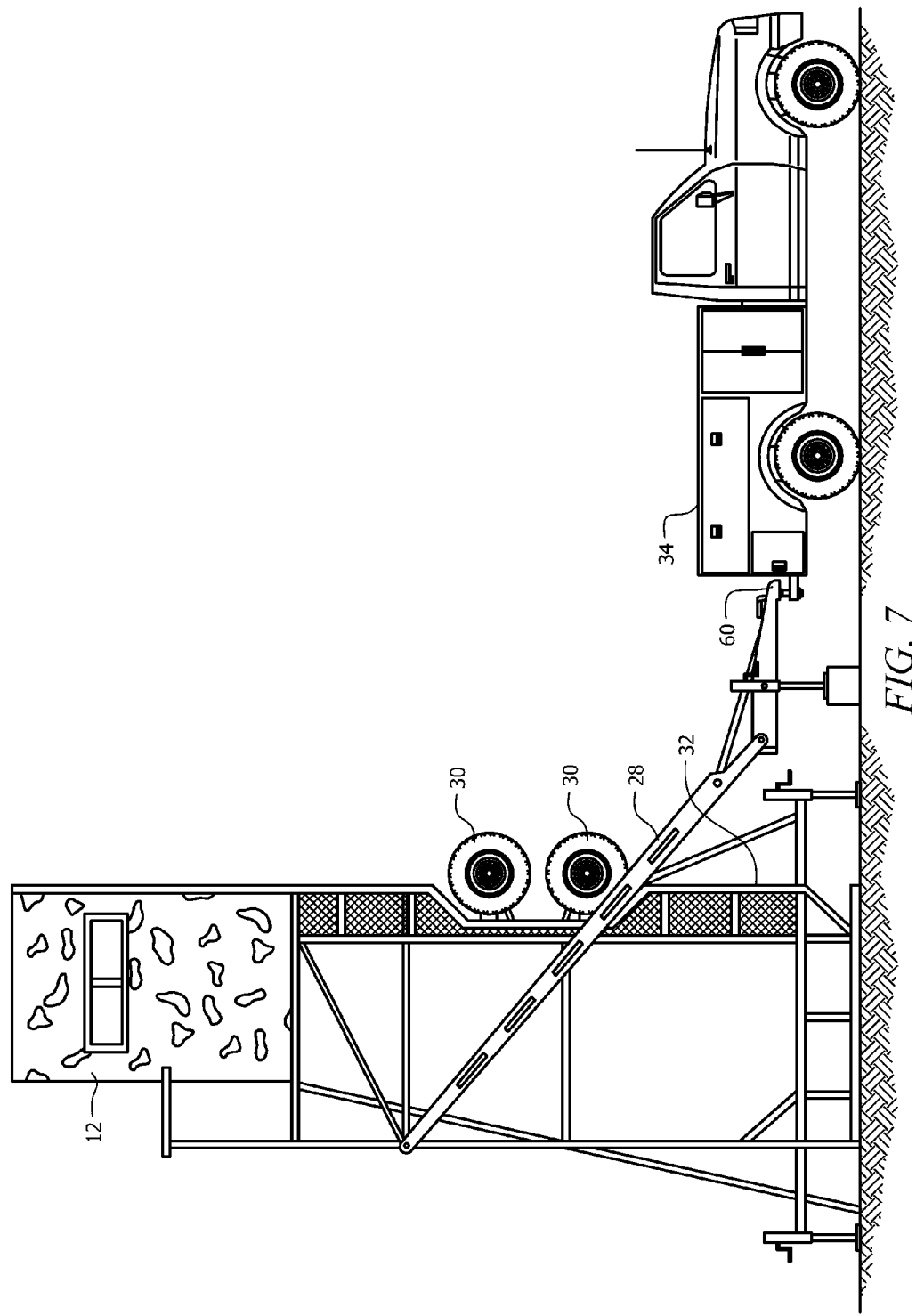
FIG. 7 depicts a connection between a tow hitch of a vehicle and a trailer tongue of a portable elevated hunting blind in a substantially upright position.

Hunting blind 10 includes one or two hinging members 28 that are elongated. One end of hinging member 28 has a connecting mechanism, such as a trailer tongue, capable of attachment to a vehicle 34 or tow hitch, and the opposing end of hinging member 28 is attached to support frame 26. The attachment between hinging member 28 and support frame 26 is adapted to allow for vertical rotation, such that hinging member 28 can stay rigidly attached to vehicle 34 when hunting blind 10 is in a substantially upright position, as depicted in FIGS. 1 and 7. FIG. 1 depicts hunting blind 10 in an upright position still attached to vehicle 34. FIG. 2 depicts hunting blind 10 in an upright position detached from vehicle 34.

Varying heights of housing 12 supported by supporting frame 26 are also contemplated by the current invention. The height at which housing 12 is supported and remains stable in the substantially upright position is dependent on the needs of the user. Certain embodiments of the current invention can sustain a height of up to thirty (30) feet.

Substantially Level Position

Figure 4:
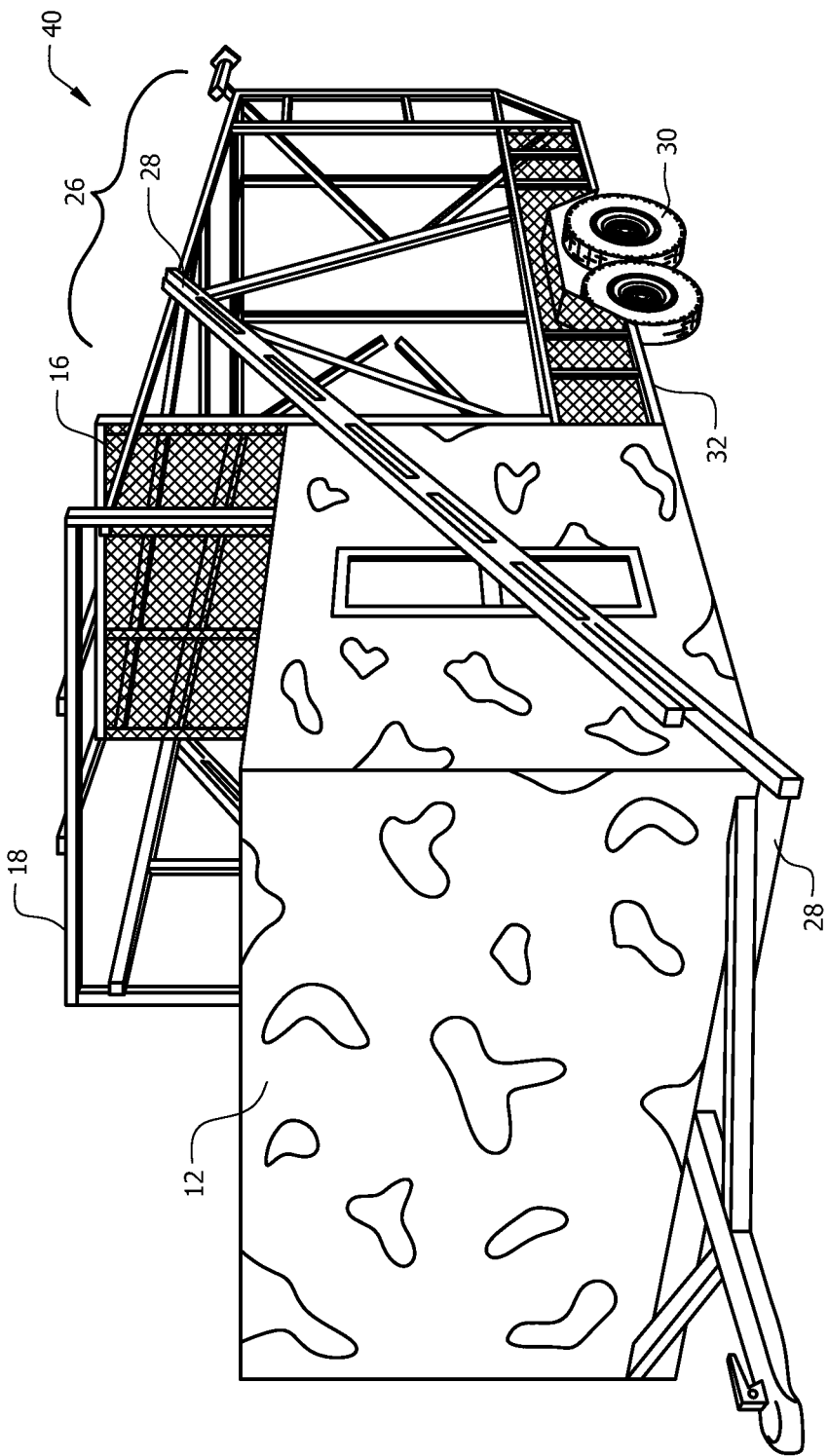
FIG. 4 is a top corner perspective view of a portable elevated hunting blind in a substantially level position.
Figure 5:
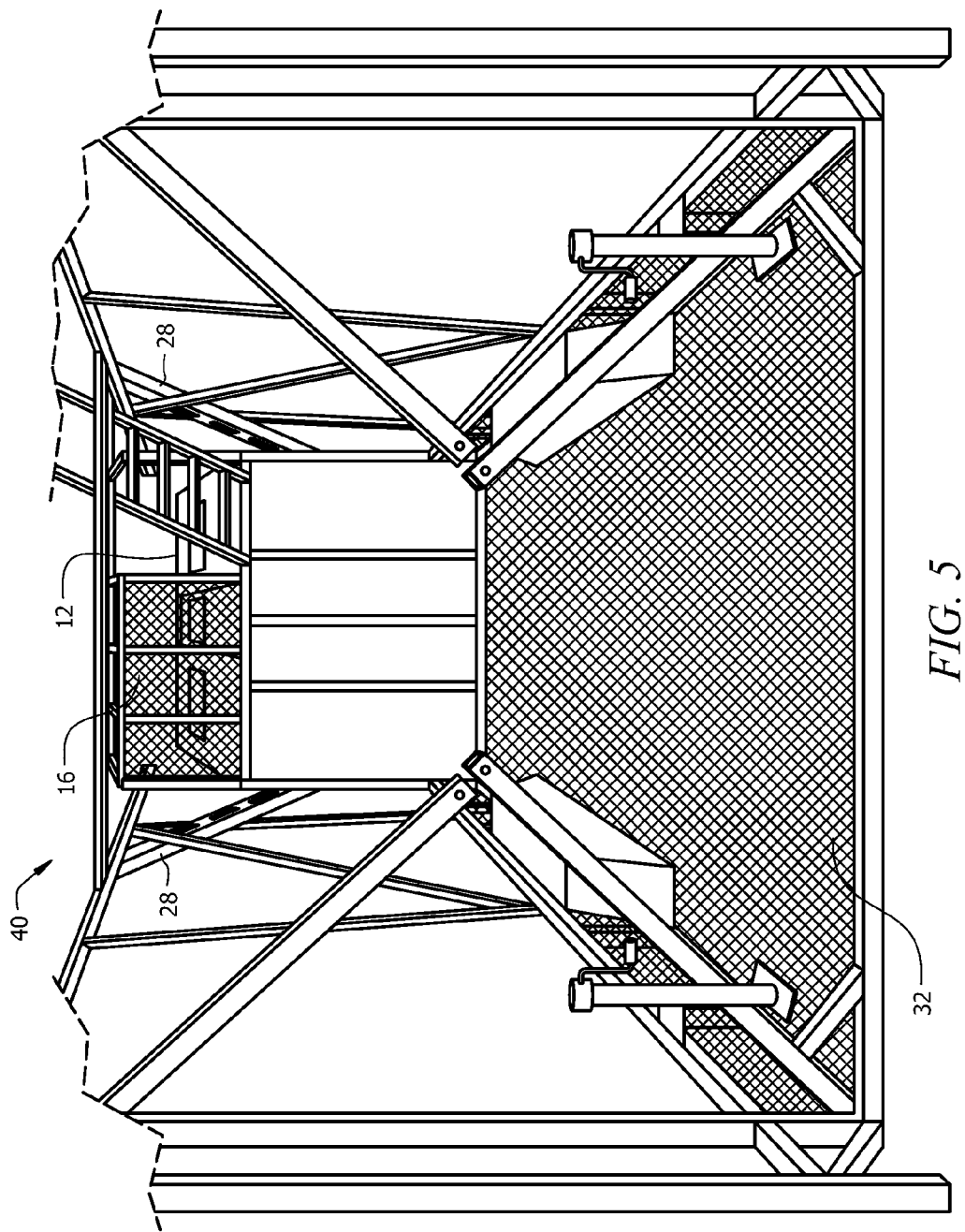
FIG. 5 is a lower perspective view of a portable elevated hunting blind in a substantially level position.
Figure 6:
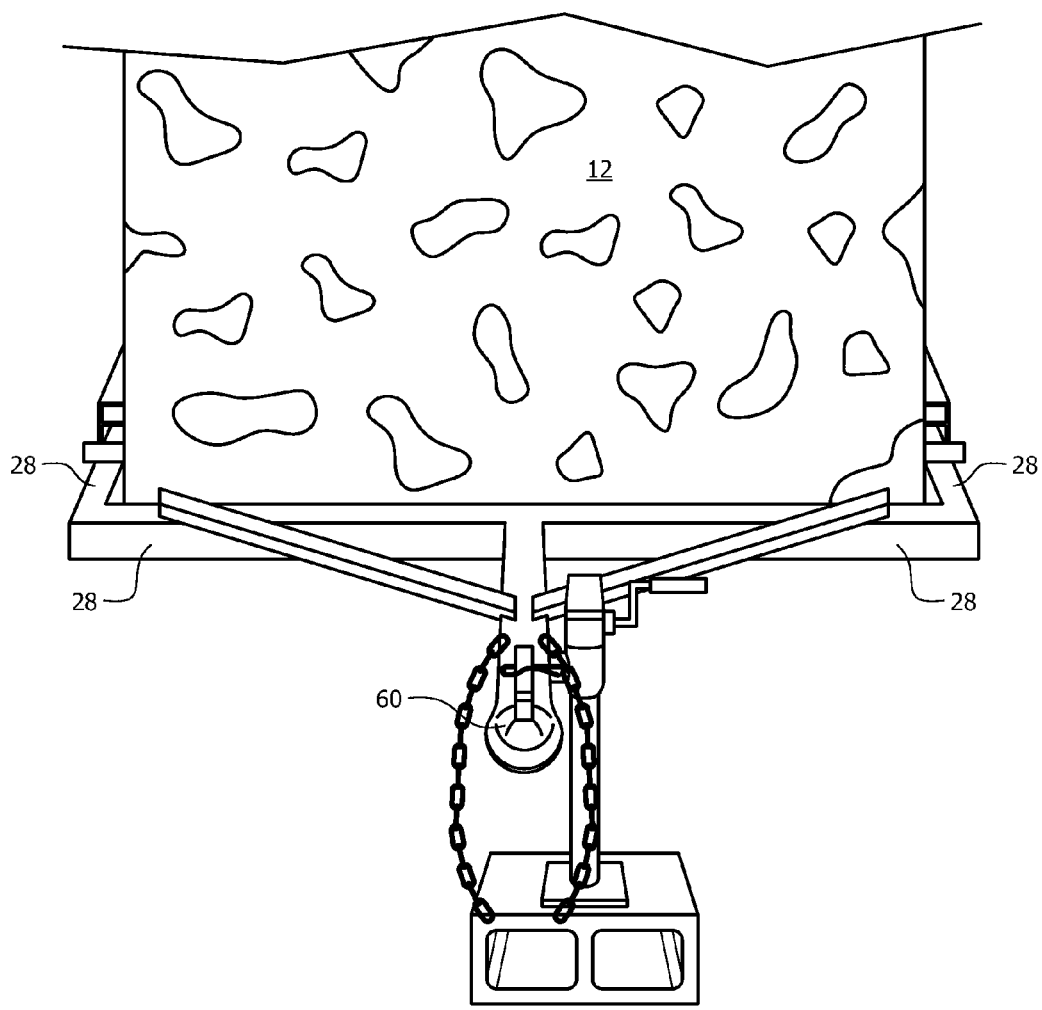
FIG. 6 depicts a trailer tongue of a portable elevated hunting blind in a substantially level position.

As depicted in FIGS. 4-6, elevated hunting blind, denoted generally by the reference numeral 40, has a second position associated with being substantially level. In certain embodiments, the current invention has the same physical structures whether the elevated hunting blind is in the substantially upright position 10 or in the substantially level position 40. Moreover, in certain embodiments, the support frame is rigid and does not collapse or fold when moving into the transportable, substantially level position 40. However, several of these same physical structures provide a different function when in the substantially level position 40 than when in the substantially upright position 10.

Hunting blind 40 also includes a support frame 26 that supports housing 12 disposed adjacent to support frame 26. Support frame 26 includes a substantially flat and rectangular base 32 extending horizontally from the floor of housing 12. Substantially flat and rectangular base 32 can merge with and form the back wall of housing 12.

Hunting blind 40 includes two hinging members 28 that are elongated and transversely disposed relative to the longitudinal axis of a towing vehicle. One end of hinging member 28 has a connecting mechanism, such as a trailer tongue, capable of attachment to a vehicle 34 or tow hitch, and the opposing end of hinging member 28 is attached to support frame 26. The attachment between hinging member 28 and support frame 26 is adapted to allow rotation in a vertical plane, i.e., about a horizontal axis of rotation, such that hinging member 28 can stay attached to vehicle 34 when hunting blind 40 is in a substantially level position, as depicted in FIGS. 4 and 6.

As depicted by FIGS. 4, 6 and 7, elevated hunting blind 40 includes hinging members 28 rotatably connected to both sides of support frame 26 of elevated hunting blind 40. Support frame 26 includes substantially flat and rectangular base 32 extending from the back wall of hunting blind 40. Support frame 26 is disposed adjacent to substantially horizontal blind housing 12 such that hinging members 28 extend laterally beyond the side walls of blind housing 12, i.e., the length of each hinging member 28 exceeds the length of each side wall of blind housing 12. The hinging members 28 may then merge at a position adjacent to the ceiling of blind housing 12 to form a single lip that can attach to vehicle 34. An example of the single lip is trailer tongue 60, depicted in FIG. 6.

FIG. 5 is a bottom view of hunting blind 40 and specifically depicts substantially flat and rectangular base 32 and the underside of the floor of housing 12. When used in hunting blind 40, substantially flat and rectangular base 32 can be used as a load-bearing trailer. Thus, various items can be transported to the destination spot, along with the hunting blind. For example, a 4×4 vehicle can be stored on substantially flat and rectangular base 32 during transportation. When the destination spot has been reached, the 4×4 vehicle can be unloaded from substantially flat and rectangular base 32, and hunting blind 40 can be deployed into a substantially upright position 10.

Attachment to Vehicle

As depicted in FIGS. 6-7, certain embodiments of the current invention are adapted to attach to a vehicle. For example, if a user has installed a tow hitch on a vehicle, the hunting blind can have a trailer tongue 60, such that during transportation, the vehicle can tow hunting blind 40 behind it and can remain attached to hunting blind 40 as it is deployed into hunting blind 10 (i.e., into a substantially upright position).

Other known methods of attaching the vehicle to the hunting blinds are contemplated. Generally, the idea is to sustain connection between the vehicle and hunting blind during transportation and during deployment of the hunting blind. All such methods of attachment are within the scope of this invention.

Engaging and Disengaging Hunting Blind

Certain embodiments of the current invention also include a method of erecting or deploying an elevated hunting blind. For example, elevated hunting blind 40 can lie in a substantially level position with elongated rigid member 28 rotatably connected to both sides of support frame 26 of elevated hunting blind 40. Support frame 26 includes substantially flat and rectangular base 32 extending from the back wall of hunting blind 40. Support frame 28 is disposed adjacent to substantially horizontal blind housing 12, such that elongated, transversely disposed rigid members 28, which are rotatably connected to support frame 26, extend laterally beyond the side walls of blind housing 12. Elongated rigid members 28 may then merge at a position adjacent to the ceiling of blind housing 12 and form a single lip that can attach to vehicle 34.

When elongated members 28 are rotatably connected to support frame 26 on their first ends and rigidly attached to the rear of vehicle 34 on their second end (i.e., the single lip), vehicle 34 can travel in reverse and deploy elevated hunting blind 40 by allowing hunting blind 40 to pivot on the lower distal corner of its substantially flat and rectangular base 32 into a substantially upright position 10. Thus, no motors, hydraulics or electronics are required on the hunting blind 10, 40. The only motor needed is that of vehicle 34 to drive hunting blind 10, 40 into the upright position.

Furthermore, support frame 26 can be rigid such that the frame itself is non-collapsible. Thus, when elevated hunting blind is disposed in a substantially level position 40, substantially flat and rectangular base 32 can act as a load-bearing trailer that can be towed behind vehicle 34.

Once hunting blind is in a substantially upright position 10, hunting blind 10 can be secured into place by use of stakes or other known mechanisms of securing an object into the ground. Once secured, elongated members 28 may remain rigidly attached to vehicle 34 or may be detached from vehicle 34 to allow hunting blind 10 to stand isolated in the substantially upright position in the desired location.

Using certain embodiments of the current invention, only one person is needed to safely erect and take down an elevated hunting blind that can accommodate multiple people in a seated or supine position. This person can attach the lip of the elongated members to the vehicle (e.g., trailer tongue to tow hitch), drive the vehicle in reverse to pivot the hunting blind into an upright position, and secure the hunting blind into the ground. Moreover, if the support frame is adapted to be non-collapsible, the hunting blind becomes multi-functional as both a hunting blind and a load-bearing trailer, as the substantially flat and rectangular base can be used as the bed of the trailer. Additionally, because no motors or hydraulics are involved, less maintenance is needed to maintain the structural integrity and utility of the hunting blind.

It will thus be seen that the objects set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An elevated hunting blind that collapses into a load-bearing trailer, comprising:
   a hunting blind housing disposed in overlying relation to a support frame and securely attached to the support frame, the elevated hunting blind having a first position and a second position,
      the first position being a substantially upright position, such that the support frame supports the housing, and
      the second position being a substantially level position, such that the support frame is the load-bearing trailer;

wherein the support frame includes a substantially planar base extending from a bottom side of the hunting blind housing, such that the substantially planar base is vertically-oriented in the first position and is horizontally-oriented in the second position, such that the substantially planar base can be used as a trailer bed when the elevated hunting blind is disposed in the second position, a plurality of wheels attached to the support frame, wherein
when the elevated hunting blind is in the first position, the plurality of wheels is not in contact with a ground on which the hunting blind is stationed, and
when the elevated hunting blind is in the second position, the plurality of wheels is in contact with the ground to support the load-bearing trailer; and a hinging member with a first end and a second end, wherein
the first end includes a trailer tongue suitable for attachment to a tow hitch of a vehicle, and
the second end is rotatably connected to the support frame in a manner to allow rotation of the elevated hunting blind from the first position to the second position when the vehicle drives in reverse, wherein the trailer tongue can maintain constant attachment to the tow hitch on the vehicle, regardless of whether the elevated hunting blind is in the first position or the second position.

2. The elevated hunting blind of claim 1, wherein
the support frame has a first length in the substantially upright position,
the support frame has a second length in the substantially level position, and
the support frame is non-collapsible such that the first length and the second length are the same.

3. The hunting blind of claim 1, wherein the hunting blind housing is capable of accommodating at least one person in a seated position.

4. The hunting blind of claim 1, wherein the hunting blind housing is capable of accommodating at least one person in a supine position.

5. The hunting blind of claim 1, wherein the elevated hunting blind in the first position is adapted to support the hunting blind housing at a height of about twenty (20) feet.

6. The elevated hunting blind of claim 1, wherein the hunting blind housing is secured behind the vehicle when the elevated hunting blind is in the second position.

7. The elevated hunting blind of claim 1, wherein the elevated hunting blind is adorned with camouflage pattern.

8. An elevated hunting blind that collapses into a load-bearing trailer, comprising:
a housing having a ceiling and a set of substantially vertical walls that define an interior capable of accommodating at least one person in a seated or supine position, the set of substantially vertical walls including a front wall, a back wall and two side walls;
a door disposed within the front wall for entering and exiting the interior of the housing;
at least one aperture disposed within at least one wall chosen from the set of substantially vertical walls, wherein the at least one aperture opens to the exterior of the housing;
a removable covering to obscure the at least one aperture, wherein the removable covering is transparent;
a substantially horizontal first base member disposed in underlying relation to the housing, wherein the substantially horizontal first base member secures the set of substantially vertical walls;
a substantially horizontal second base member disposed adjacent to the front wall and extending laterally from the first base member away from the front wall;
a ladder adjacent to the second base member extending from an edge of the first base member to a ground on which the hunting blind is stationed;
a support frame having a first position and a second position, wherein
when the support frame is in the first position, the support frame supports the housing in a substantially upright position, and
when the support frame is in the second position, the support frame embodies the load-bearing trailer;
a plurality of wheels attached to the support frame, wherein
when the support frame is in the first position, the plurality of wheels is not in contact with the ground, and
when the support frame is in the second position, the plurality of wheels is in contact with the ground to support the load-bearing trailer; and
a hinging member with a first end and a second end, wherein
the first end includes a trailer tongue, and
the second end is rotatably connected to the support frame, such that the trailer tongue can maintain constant attachment to a tow hitch on a vehicle, regardless of whether the support frame is in the first position or the second position.

* * * * *

UNITED STATES PATENT AND TRADEMARK OFFICE
CERTIFICATE OF CORRECTION

PATENT NO. : 8,777,254 B1
APPLICATION NO. : 13/312334
DATED : July 15, 2014
INVENTOR(S) : John D. Fowler It is certified that error appears in the above-identified patent and that said Letters Patent is hereby corrected as shown below:

In the Claims

Column 6, line 58, cancel the text beginning with "1. An elevated hunting blind" to and ending "second position." in column 7, line 27, and insert the following claim:

--1. An elevated hunting blind that collapses into a load-bearing trailer, comprising:
  a hunting blind housing disposed in overlying relation to a support frame and securely attached to the support frame, the elevated hunting blind having a first position and a second position,
    the first position being a substantially upright position, such that the support frame supports the housing, and
    the second position being a substantially level position, such that the support frame is the load-bearing trailer,
    wherein the support frame includes a substantially planar mesh base extending from a bottom side of the hunting blind housing with a crossbeam underneath the substantially planar mesh base for support, such that the substantially planar mesh base is vertically-oriented in the first position and is horizontally-oriented in the second position, so that the substantially planar mesh base can be used as a trailer bed when the elevated hunting blind is disposed in the second position;
  a plurality of wheels attached to the support frame, wherein
    when the elevated hunting blind is in the first position, the plurality of wheels is not in contact with a ground on which the hunting blind is stationed, and
    when the elevated hunting blind is in the second position, the plurality of wheels is in contact with the ground to support the load-bearing trailer; and
  a hinging member with a first end and a second end, wherein
    the first end includes a trailer tongue suitable for attachment to a tow hitch of a vehicle, and
    the second end is rotatably connected to the support frame at a connection point where at least a portion of the hinging member is upwardly angled relative to the longitudinal axis of the hunting blind in the second position, wherein the trailer tongue can maintain constant attachment to the tow hitch on the vehicle, regardless of whether the elevated hunting blind is in the first position or the second position.--
Column 7, line 28, cancel the text beginning with "2. The elevated hunting blind" to and ending "are Signed and Sealed this
Twenty-first Day of October, 2014

Michelle K. Lee
*Deputy Director of the United States Patent and Trademark Office*

CERTIFICATE OF CORRECTION (continued)
U.S. Pat. No. 8,777,254 B1 the same." in column 7, line 34, and insert the following claim:

--2. The elevated hunting blind of claim 1, wherein
the support frame is non-collapsible such that the length of the support frame stays the same in the first position and in the second position.--

Column 8, line 31, cancel the text beginning with "when the support frame" to and ending "the second position." in column 8, line 48, and insert the following:

when the support frame in the second position, the support frame embodies the load-bearing trailer in a substantially level position,
    wherein the support frame includes a substantially planar mesh base extending from a bottom side of the hunting blind housing with a crossbeam underneath the substantially planar mesh base for support, such that the substantially planar mesh base is vertically-oriented in the first position and is horizontally-oriented in the second position, so that the substantially planar mesh base can be used as a trailer bed when the elevated hunting blind is disposed in the second position;
    a plurality of wheels attached to the support frame, wherein
        when the support frame is in the first position, the plurality of wheels is not in contact with the ground, and
        when the support frame is in the second position, the plurality of wheels is in contact with the ground to support the load-bearing trailer; and
    a hinging member with a first end and a second end, wherein
        the first end includes a trailer tongue, and
        the second end is rotatably connected to the support frame at a connection point where at least a portion of the hinging member is upwardly angled relative to the longitudinal axis of the hunting blind in the second position, wherein the trailer tongue can maintain constant attachment to a tow hitch on the vehicle, regardless of whether the support frame is in the first position or the second position.--